US010531768B1

(12) United States Patent
Brandt

(10) Patent No.: US 10,531,768 B1
(45) Date of Patent: Jan. 14, 2020

(54) FOOD CHOPPER

(71) Applicant: Daniel Brandt, Woodbury, MN (US)

(72) Inventor: Daniel Brandt, Woodbury, MN (US)

(73) Assignee: DBrandt Enterprises LLC, Woodbury, MN (US)

(*) Notice: Subject to any disclaimer, the term of this patent is extended or adjusted under 35 U.S.C. 154(b) by 0 days.

(21) Appl. No.: 15/696,724

(22) Filed: Sep. 6, 2017

Related U.S. Application Data

(60) Provisional application No. 62/449,767, filed on Jan. 24, 2017.

(51) Int. Cl.
A47J 43/04 (2006.01)
B26D 3/24 (2006.01)
A23L 5/30 (2016.01)
B25G 1/10 (2006.01)

(52) U.S. Cl.
CPC ............ A47J 43/04 (2013.01); A23L 5/30 (2016.08); B25G 1/102 (2013.01); B26D 3/24 (2013.01); A23V 2002/00 (2013.01); B26D 2210/02 (2013.01)

(58) Field of Classification Search
CPC . A47J 43/04; A23L 5/30; B25G 1/102; B26D 3/24; B26D 2210/02; A23V 2002/00
USPC ..... 30/302–305, 287–289, 114–116; 83/167, 83/733, 762, 862
See application file for complete search history.

(56) References Cited

U.S. PATENT DOCUMENTS

| 1,110,946 | A | * | 9/1914 | Lahière | B26B 23/00 30/128 |
| 1,457,374 | A | * | 6/1923 | Lazarus | B26B 23/00 30/305 |
| 1,814,528 | A | * | 7/1931 | Purcell | 30/304 |
| 2,113,085 | A | * | 4/1938 | Higgs | B26B 23/00 30/128 |
| 2,396,443 | A | * | 3/1946 | Singer | B26B 3/04 30/304 |
| 2,680,907 | A | * | 6/1954 | Palosaari | B26B 23/00 30/302 |
| 2,791,026 | A | * | 5/1957 | Byrd | B26B 3/03 30/115 |
| 2,986,815 | A | * | 6/1961 | Fernald | B26B 3/04 30/304 |
| 3,362,071 | A | * | 1/1968 | Schmidt | B23D 29/026 30/258 |
| 4,349,058 | A | * | 9/1982 | Comparetto | A61B 17/1604 30/168 |

(Continued)

Primary Examiner — Ghassem Alie
Assistant Examiner — Bharat C Patel
(74) Attorney, Agent, or Firm — Michael A. Bondi; Moss & Barnett

(57) ABSTRACT

A food chopper having a handle, a first side cutting blade, a second side cutting blade and a central cutting blade. The first side cutting blade is attached to the handle. The second side cutting blade is attached to the handle in a spaced-apart relationship with respect to the first side cutting blade. The central cutting blade is operably attached to the handle intermediate the first side cutting blade and the second side cutting blade for movement between an extended configuration and a retracted configuration. The central cutting blade is biased to the extended configuration. At least one of the first side cutting blade and the second side cutting blade is curved.

20 Claims, 11 Drawing Sheets

(56) References Cited

U.S. PATENT DOCUMENTS

| | | | | |
|---|---|---|---|---|
| 7,255,705 B2* | 8/2007 | Hsu | ............ | A61B 17/32 |
| | | | | 30/304 |
| 7,654,953 B2* | 2/2010 | Borodulin | ............ | A61B 1/32 |
| | | | | 600/213 |
| 2005/0229405 A1* | 10/2005 | Endres | ............ | B26B 5/008 |
| | | | | 30/305 |
| 2009/0100687 A1* | 4/2009 | Mills | ............ | B26B 3/04 |
| | | | | 30/304 |
| 2010/0057100 A1* | 3/2010 | Zeevi | ............ | A61B 17/32093 |
| | | | | 606/133 |

* cited by examiner

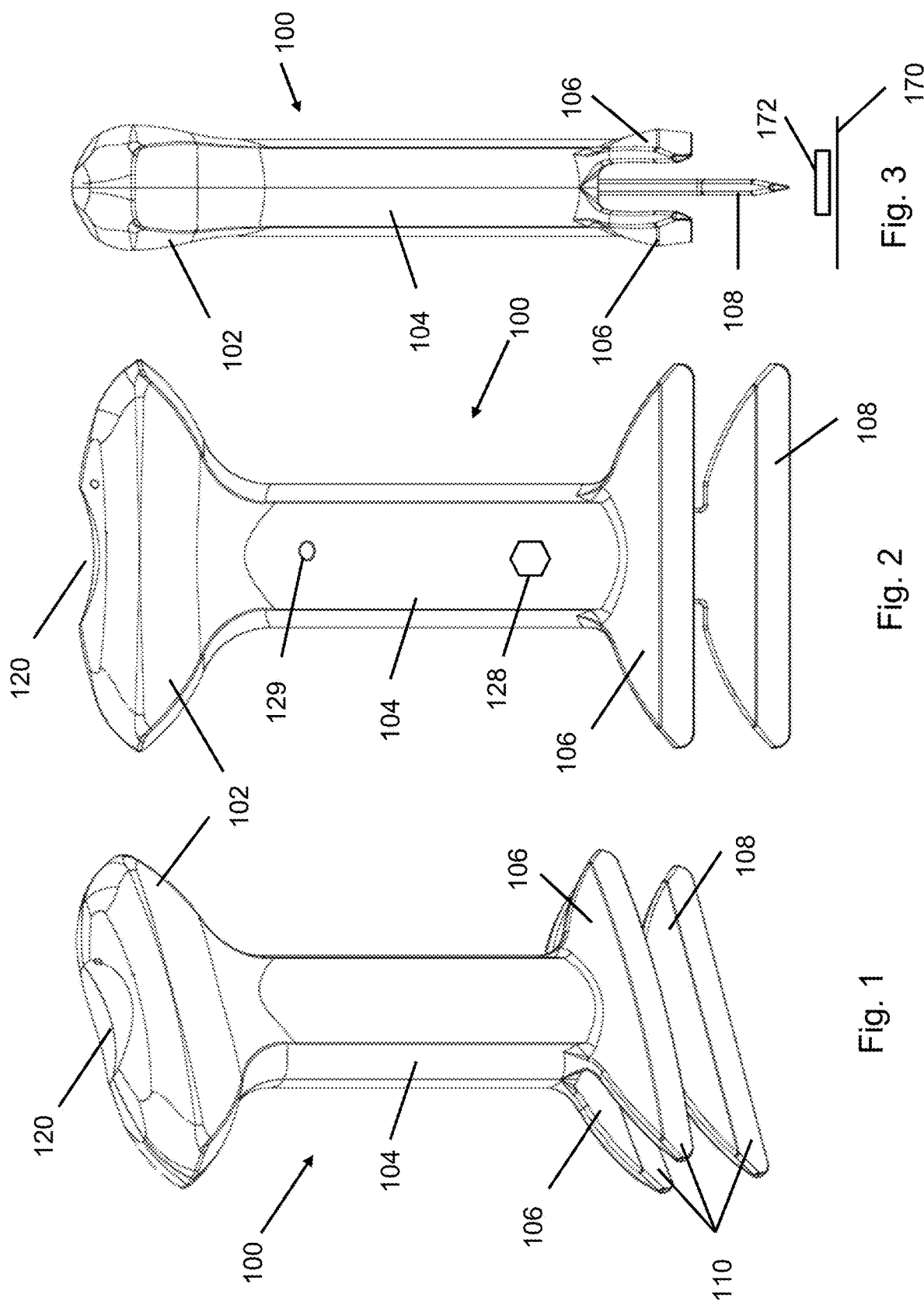

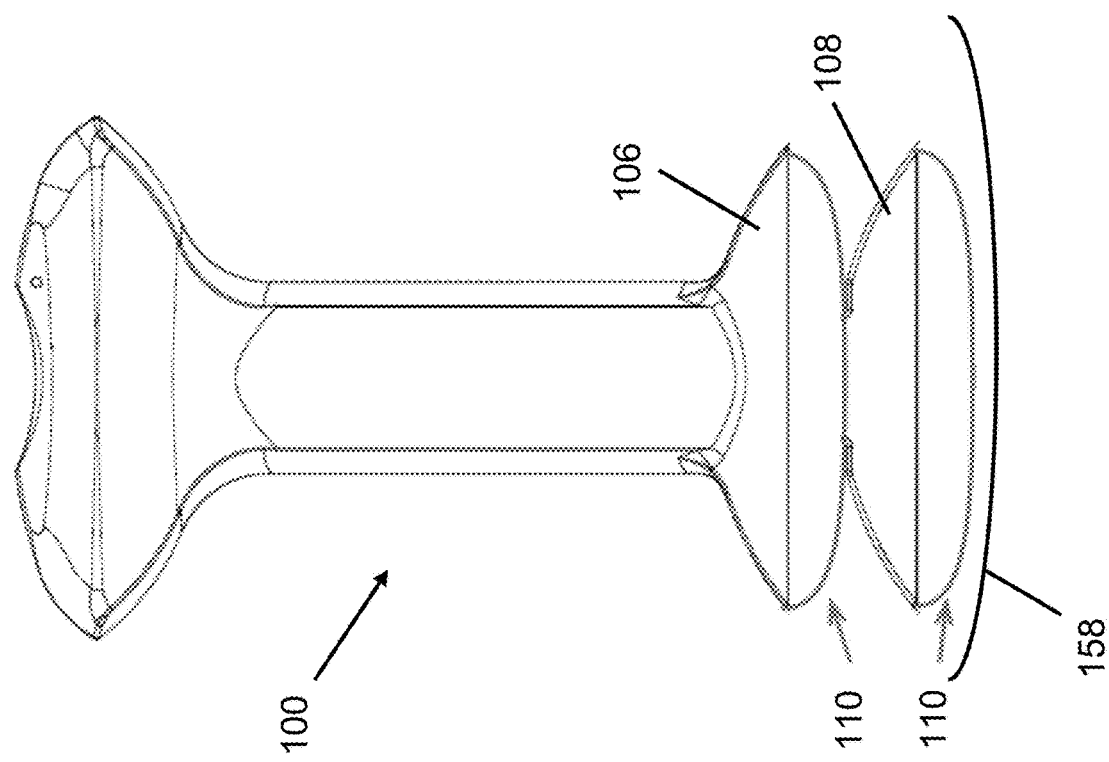

FOOD CHOPPER

REFERENCE TO RELATED APPLICATION

This application claims priority to Provisional Applic. Ser. No. 62/449,767, filed on Jan. 24, 2017, the contents of which are incorporated herein by reference.

FIELD OF THE INVENTION

The present invention generally relates to food preparation accessories, and more particularly to a hand-operated chopper for food items.

BACKGROUND OF THE INVENTION

Many recipes require food ingredients that must be chopped or minced. Chopping and mincing food items effectively and easily can be difficult and time consuming. Examples are the chopping of ground beef during cooking to create finer pieces, chopping canned or fresh tomatoes, lettuce or other food items into smaller pieces effectively and easily.

Electric food processors address speed and ease of chopping/mincing, but they are imprecise devices that can over-process the food item even when watched closely. In addition, such devices can be difficult to clean and bulky to store.

Thus, there is a continuing need for food preparation accessories that assist the user in easily and precisely chopping food items.

SUMMARY OF THE INVENTION

An embodiment of the invention is directed to a food chopper that includes a handle, a first side cutting blade, a second side cutting blade and a central cutting blade. The first side cutting blade is attached to the handle. The second side cutting blade is attached to the handle in a spaced-apart relationship with respect to the first side cutting blade. The central cutting blade is operably attached to the handle intermediate the first side cutting blade and the second side cutting blade for movement between an extended configuration and a retracted configuration. The central cutting blade is biased to the extended configuration. At least one of the first side cutting blade and the second side cutting blade is curved.

Another embodiment of the invention is directed to a food chopper that includes a shaft, a handle, a first side cutting blade, a second side cutting blade, a central cutting blade and a biasing mechanism. The shaft has a proximal end and a distal end. The handle is attached to the proximal end of the shaft. The first side cutting blade is attached to the distal end of the shaft. The second side cutting blade is attached to the distal end of the shaft in a spaced-apart relationship with respect to the first side cutting blade. The central cutting blade is operably mounted to the distal end of the shaft for movement between a retracted configuration and an extended configuration. The biasing mechanism is mounted substantially within the shaft. The biasing mechanism biases the central cutting blade to the extended configuration.

Another embodiment of the invention is directed to a method of chopping food. A food chopper is provided that includes a handle, a first side cutting blade, a second side cutting blade and a central cutting blade. The first side cutting blade is attached to the handle. The second side cutting blade is attached to the handle in a spaced-apart relationship with respect to the first side cutting blade. The central cutting blade is operably attached to the handle intermediate the first side cutting blade and the second side cutting blade. At least one of the first side cutting blade and the second side cutting blade is curved. The central cutting blade is movable between a retracted configuration and an extended configuration. The central cutting blade is biased to the extended configuration. An object that is to be cut is placed on a surface. The central cutting blade is placed in contact with at least one of the object and the surface. The handle is urged towards the surface to cause the first side cutting blade and the second side cutting blade to contact the surface and cut the object into pieces. The curve of the first side cutting blade and the second side cutting blade causes the pieces to mix.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a perspective view of a food chopper according to an embodiment of the invention where a central blade member is in an extended configuration.

FIG. 2 is a front view of the food chopper of FIG. 1.

FIG. 3 is a side view of the food chopper of FIG. 1.

FIG. 16 is a side view of another embodiment of the food chopper with a curved lower surface on the central cutting blade and the side cutting blade.

DETAILED DESCRIPTION OF THE INVENTION

Figure 5:
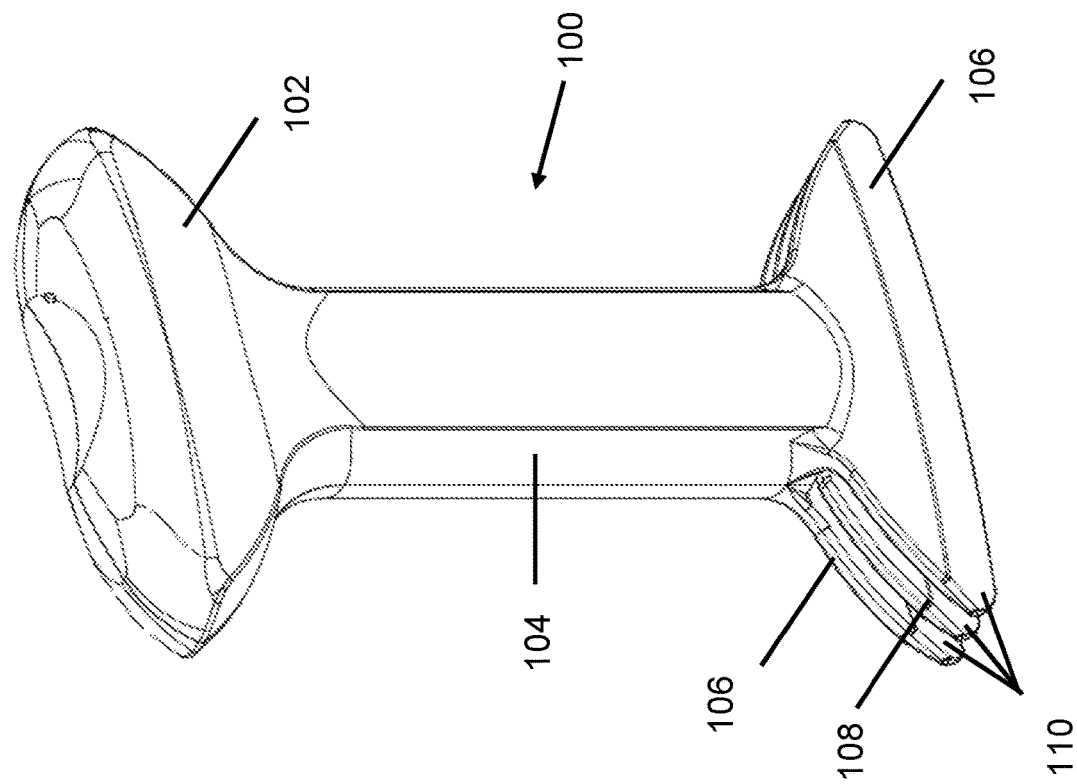
FIG. 5 is a perspective view of the food chopper of FIG. 1 where the central blade member is in a retracted configuration.

An embodiment of the invention is directed to a food chopper as illustrated at 100 in FIG. 1-3. The food chopper 100 is suited for use in chopping a variety of types of foods, examples of which include meats, fruits, vegetables and nuts. FIGS. 1-3 illustrate the food chopper 100 in an extended configuration while FIG. 5 illustrates the food chopper 100 in a retracted configuration.

The food chopper 100 generally includes a handle 102, a first side cutting blade 106, a second side cutting blade 106 and a central cutting blade 108. The first side cutting blade 106 and the second side cutting blade 106 are mounted in a spaced apart relationship with respect to the handle 102. In certain embodiments, the first cutting blade 106 and the second side cutting blade 106 are mounted in a stationary position with respect to the handle 102.

The central cutting blade 108 is operably mounted to the handle 102 intermediate the first side cutting blade 106 and the second side cutting blade 106. In certain embodiments, a distance between the central cutting blade 108 and the first side cutting blade 106 is approximately the same as a spacing between the central cutting blade 108 and the second side cutting blade 106.

The central cutting blade 108 is linearly slidable between an extended configuration and a retracted configuration. When in the extended configuration, a distal edge 110 of the central cutting blade 108 extends beyond a distal edge 110 of at least one of the first side cutting blade 106 and the second side cutting blade 106 as illustrated in FIGS. 1-3. When in the retracted configuration, the distal edge 110 of the central cutting blade 26 is generally aligned with the distal edge 110 of at least one of the first side cutting blade 106 and the second side cutting blade 106 as illustrated in FIG. 5.

In certain embodiments, the central cutting blade 108 is biased to the extended configuration. One technique that may be used to bias the central cutting blade 108 to the extended configuration is a spring 112.

The first side cutting blade 106, the second side cutting blade 106 and the central cutting blade 108 may each have a cutting surface along the distal edge 113 thereof. The cutting surfaces may be fabricated from the same material as the other portions of the first side cutting blade 106, the second side cutting blade 106 and the central cutting blade 108. Alternatively, the cutting surfaces may be fabricated from a different material than the other portions of the first side cutting blade 106, the second side cutting blade 106 and the central cutting blade 108.

The distal edges 110 of the first side cutting blade 106, the second side cutting blade 106 and the central cutting blade 108 may each have a similar length. In other embodiments, the distal edge 110 of the central cutting blade 108 may have a length that is greater than or less than the length of the distal edges 110 of the first side cutting blade 106 and the second side cutting blade 106. In certain embodiments, the distal edges 110 of the first side cutting blade 106 and the second side cutting blade 106 may each have a similar length.

The distal edges 110 of the first side cutting blade 106, the second side cutting blade 106 and the central cutting blade 108 may be formed with a generally straight or linear configuration. In other embodiments, the first side cutting blade 106 and the second side cutting blade 106 may be formed with a curved shape.

As used herein, the curved shape means that a distance between the first side cutting blade 106 and the central cutting blade 108 proximate an end of the first side cutting blade 106 is smaller than a distance between the first side cutting blade 106 and the central cutting blade 108 intermediate opposite ends of the first side cutting blade 106. Similarly, a distance between the second side cutting blade 106 and the central cutting blade 108 proximate an end of the second side cutting blade 106 is smaller than a distance between the second side cutting blade 106 and the central cutting blade 108 intermediate opposite ends of the second side cutting blade 106.

In certain embodiments, the distance between the first side cutting blade 106 and the central cutting blade 108 is at least 20 percent larger proximate the ends of the first side cutting blade 106 as compared to intermediate the ends of the first side cutting blade 106. In other embodiments, the distance between the first side cutting blade 106 and the central cutting blade 108 is between about 40 percent and 100 percent larger proximate the ends of the first side cutting blade 106 as compared to intermediate the ends of the first side cutting blade 106.

Using the first side cutting blade 106 and the second side cutting blade 106 with the curved shape promotes mixing of the food as the food is being cut with the food chopper 100. Such enhanced mixing not only provides more even cutting of the food but also reduces the time for preparing the food because separate mixing step can be avoided or reduced. This shape also increases the cutting of the food because the food is urged to stay within the region such that the food is contacted by the cutting blades.

Figure 9:
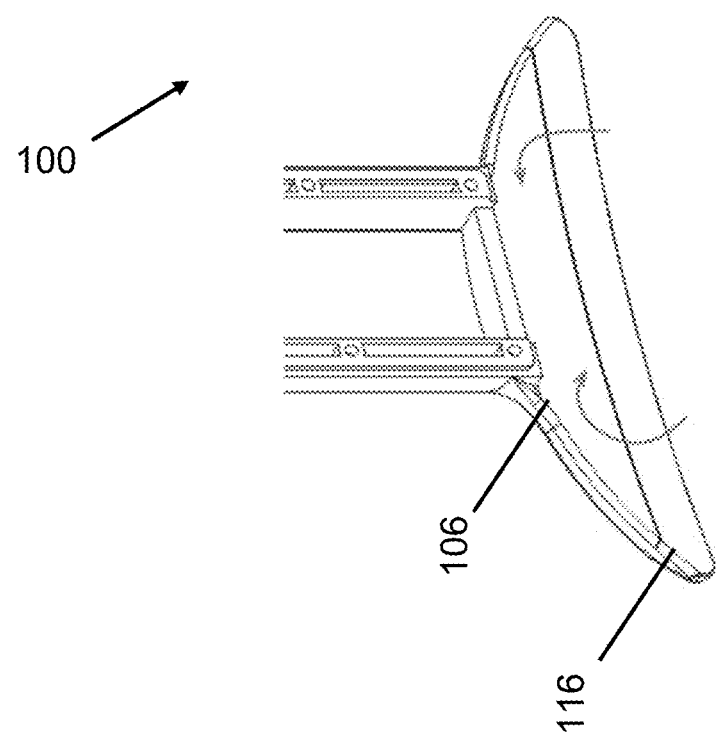
FIG. 9 is a lower perspective view of a curved side cutting blade.

In addition to the side cutting blades having a lateral curvature, the side cutting blades 106 may be formed with a vertical curvature as illustrated in FIG. 9. The vertical curvature promotes mixing of the food being cut with the food chopper 100.

At least one of the cutting blades 106, 108 may have a hardened surface 116 proximate the distal end thereof. The hardened surface 116 may be particularly suited for cutting harder foods and/or foods that are more difficult to cut through. This hardened surface 116 may be sharper than the distal ends of the cutting blades. Alternatively or additionally, the hardened surface 116 may be more durable than the distal ends of the cutting blades.

In certain embodiments, the hardened surface 116 may be removably attached to the distal ends of the cutting blades 106, 108. In other embodiments, the hardened surface 116 is fixedly attached to the distal ends of the cutting blades 106, 108. In certain embodiments, the hardened surface 116 may be associated with all of the cutting blades 106, 108. In other embodiments, the hardened surface 116 is attached to fewer than all of the cutting blades 106, 108. The hardened surface 116 may be fabricated from a variety of materials, examples of which include stainless steel or polymeric materials.

At least one of the cutting blades 106, 108 may have a less sharp or wider surface 116 proximate the distal thereof. This less sharp or wider surface 116 may be less sharp and/or wider than the distal ends of the cutting blades 106, 108. This configuration may be particularly suited for tasks such as mashing potatoes or processing avocados into guacamole. In certain embodiments, the less sharp or wider surface 116 may be removably attached to the distal ends of the cutting blades 106, 108. The less sharp cutting blade can also be used in conjunction with shredding meats such as chicken or pork as the less sharp nature of the cutting blade promotes shredding as opposed to cutting of the food.

In other embodiments, the less sharp or wider surface 116 is fixedly attached to the distal ends of the cutting blades 106, 108. In certain embodiments, the less sharp or wider surface 116 may be associated with all of the cutting blades 106, 108. In other embodiments, the less sharp or wider surface 116 is attached to fewer than all of the cutting blades 106, 108. The less sharp or wider surface 116 may be fabricated from a variety of materials, examples of which include polymeric materials.

In certain embodiments, the handle 102 is ergonomically shaped. The handle 102 incorporates many features that enhance the ability to use the food chopper 100. An upper surface of the handle 102 is curved when moving from a center thereof to side edges thereof. The upper surface of the handle 102 is curved when moving from the center thereof to end edges thereof. The handle 102 is thereby shaped to generally conform to the person's hand when the person's hand is wrapped around the handle 102 while using the food chopper 100.

Proximate the center of the handle 102, a recess region 120 is provided in the upper surface of the handle 102. In certain embodiments, the recess region 120 is curved in a direction between the end edges of the handle 102 and generally planar in a direction between the side edges of the handle 102. The recess region 120 facilitates receiving a portion of the user's hand to cause the user's hand to be positioned along a central axis of the food chopper 100. Such positioning of the user's hand enhances the ability to evenly press on the food chopper 100.

The lower surface of the shaft 104 may be formed with a shape to urge the food under the food chopper 100 away from the center of the food chopper 100. In certain embodiments, the lower surface of the housing is angled outwardly towards opposite sides thereof. In other embodiments, the lower surface of the shaft 104 is curved with a large radius of curvature.

This configuration reduces the potential of the downward movement of the food chopper 100 will cause food to be urged into the interior of the food chopper 100. Reducing and/or eliminating the food entering shaft 104 makes it easier to clean the food chopper 100. Another benefit of this configuration is that it provides a mixing action for food that is being cut with the food chopper 100.

The lower surface of the handle 102 is tapered when moving from the center of the handle 102 to the end edges of the handle 102. In certain embodiments, the lower surface of the handle 102 is curved in a direction between the end edges of the handle 102 and generally planar in a directed between the side edges of the handle 102. This configuration enhances the ability of the user to wrap his/her fingers around the handle 102, which reduces the potential of the food chopper 100 falling out of the person's hands while the person is using the food chopper 100.

To further reduce the potential of the handle 102 inadvertently moving with respect to the user's hand, a least a portion of the handle 102 may have a surface texture that provides a reduced slippage. An example of one reduced slippage surface has a texture with raised areas. Alternatively or additionally, at least a portion of the handle 102 may be covered with a slip-resistant material such as rubber that reduces the potential of the user's hand inadvertently moving with respect to the handle 102.

The shaft 104 extends between the handle 102 and the first side cutting blade 106 and the second side cutting blade 106. The shaft 104 serves two functions. The first function of the shaft 104 is to provide structural rigidity to the food chopper 100 such that a force applied to the handle 102 is transferred to the distal ends of the first side cutting blade 106, the second side cutting blade 106 and the central cutting blade 108.

The second function is to enclose the spring 112 to minimize the potential of food being chopped with the food chopper 100 coming into contact with the spring 112. Contact between the food and the spring 112 is undesirable because such contact could lead to degradation of the spring 112 and/or cause contamination of the food.

In certain embodiments, the shaft 104 has a generally square shape. In other embodiments, the sides of the shaft 104 may have a concave shape. While it is illustrated that the shaft 104 has a width that is considerably smaller than the width of the central cutting blade 108, it is possible for the shaft 104 to have a greater width.

Figure 4:
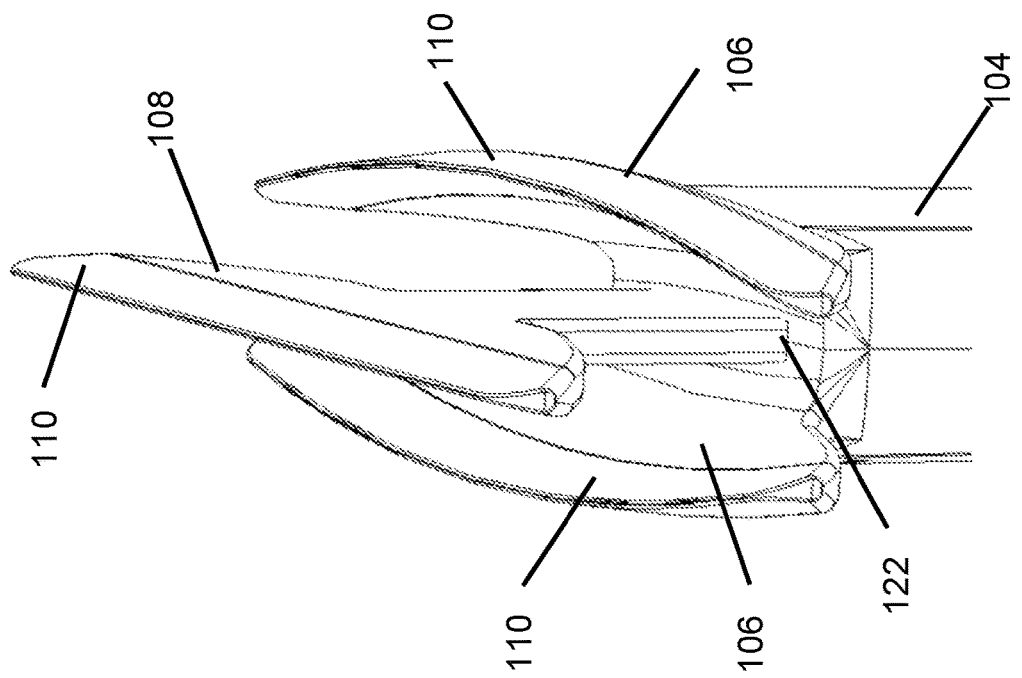
FIG. 4 is a lower perspective view of the food chopper of FIG. 1.

An opening 122 in a lower surface of the shaft 104 may be formed with a size and shape that are similar to the size and shape of an intermediate region of the central cutting blade 108, as illustrated in FIG. 4. Such a configuration minimizes the potential of food getting into the interior of the food chopper 100.

A gasket (not shown) may be provided where the intermediate region of the central cutting blade 108 extends through the shaft 104 to further reduce the potential of the food getting into the interior of the shaft 104. The gasket could be fabricated from a resilient material.

As discussed above, the shaft 104 may be substantially sealed other than the opening 122 to reduce the potential of food entering the interior of the food chopper 100. In other embodiments, the shaft 104 includes at least one aperture 124 formed therein. The at least one aperture 124 enhances the ability to drain liquid that enters the interior of the shaft 104. The at least one aperture 124 may be located proximate the handle 102 to reduce the potential of food inadvertently entering the at least one aperture 124.

Figure 13:
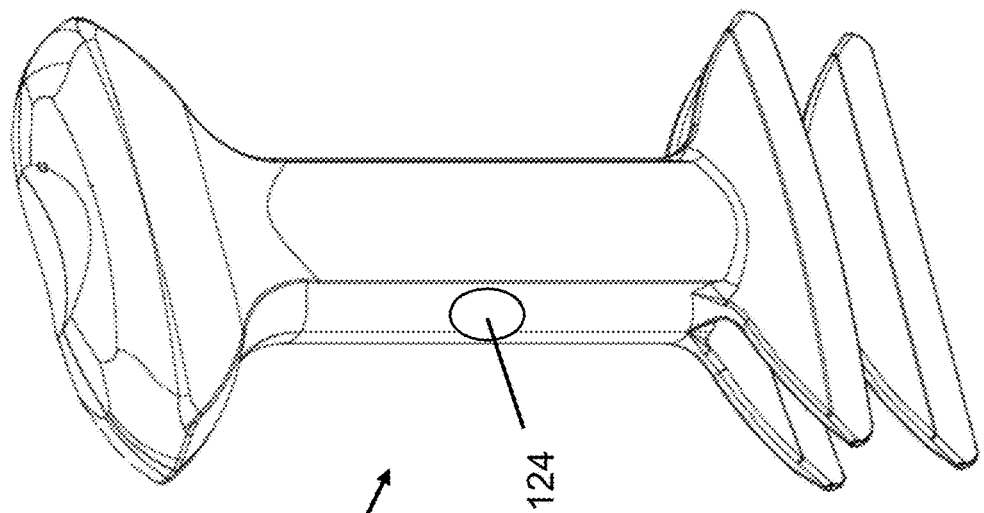
FIG. 13 is a perspective view of an alternative embodiment of the food chopper that includes a circular cleaning window.
Figure 12:
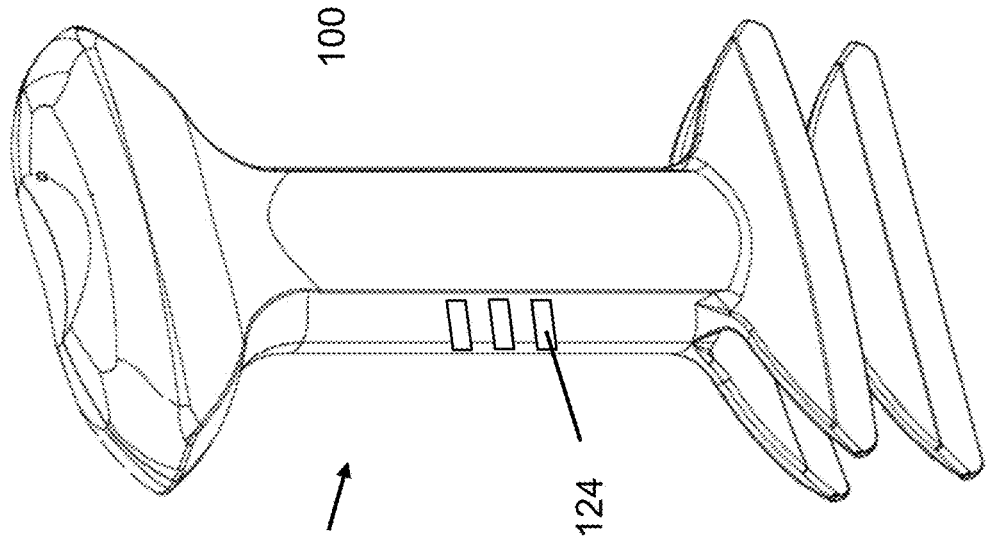
FIG. 12 is a perspective view of an alternative embodiment of the food chopper that includes a plurality of cleaning vents.
Figure 11:
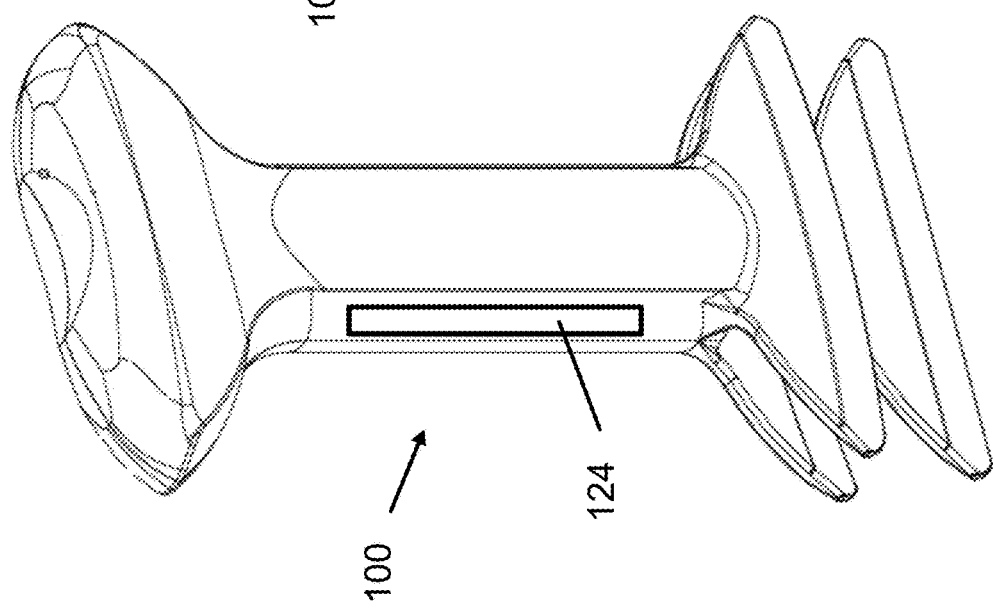
FIG. 11 is a perspective view of an alternative embodiment of the food chopper that includes an elongated cleaning hole.
Figure 15:
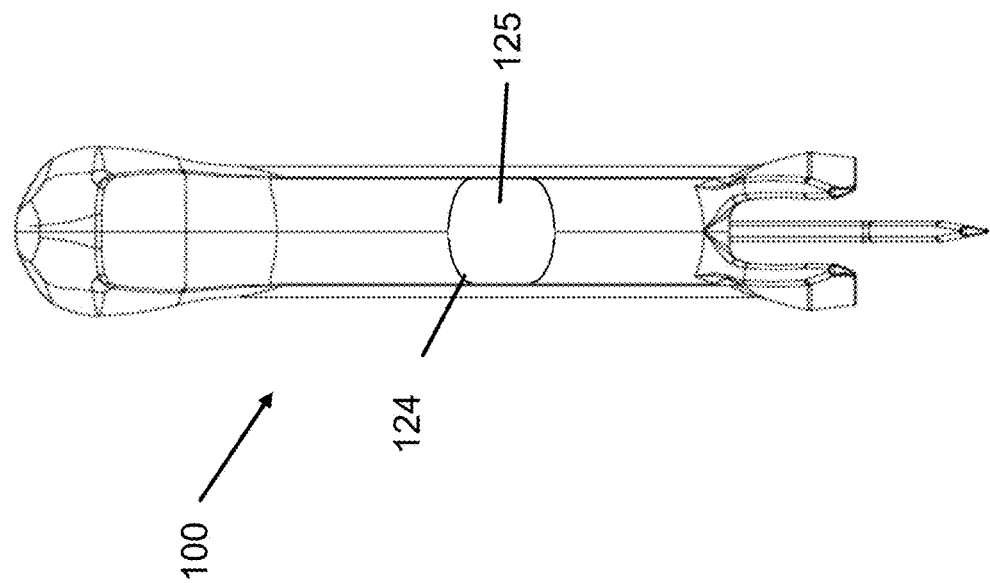
FIG. 15 is a side view of an alternative embodiment of the food chopper that includes a removable cleaning cover.
Figure 14:
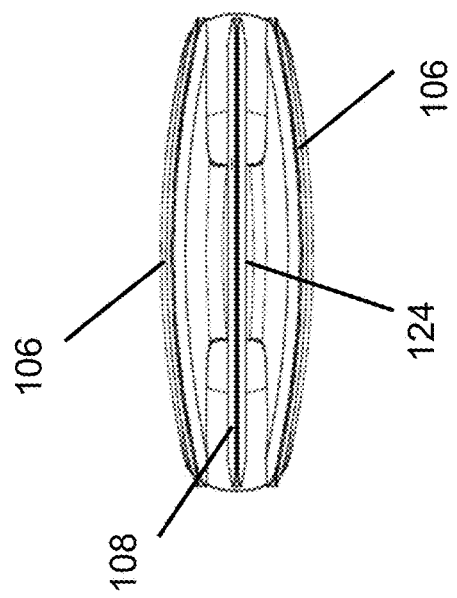
FIG. 14 is a lower view of an alternative embodiment of the food chopper that includes a cleaning vent.

In certain embodiments, the at least one aperture 124 is an elongated aperture as illustrated in FIG. 11, a plurality of slots 124 as illustrated in FIG. 12, a generally circular shape as illustrated in FIG. 13, an opening 124 in a lower surface as illustrated in FIG. 14. In other embodiments, a removable cover 125 extends over at least a portion of the aperture 124 as illustrated in FIG. 15.

Figure 8:
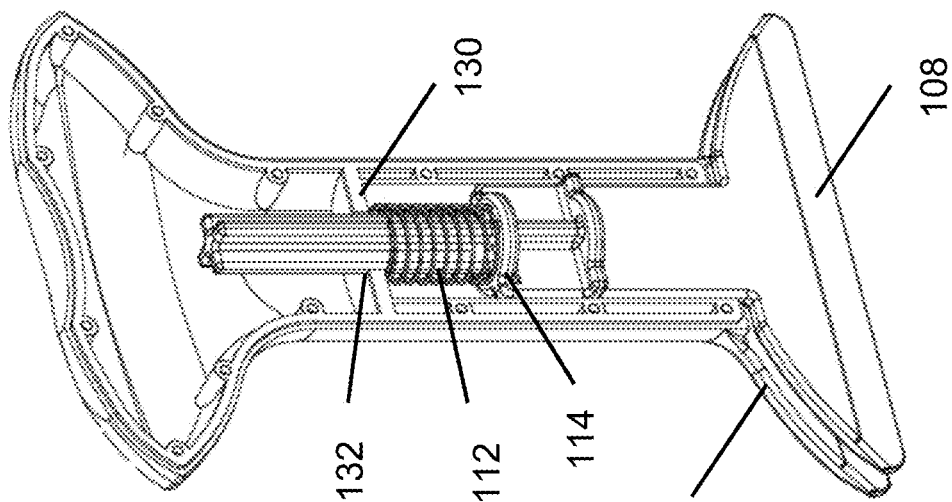
FIG. 8 is a perspective view of the back housing with the central cutting blade in the retracted configuration.
Figure 7:
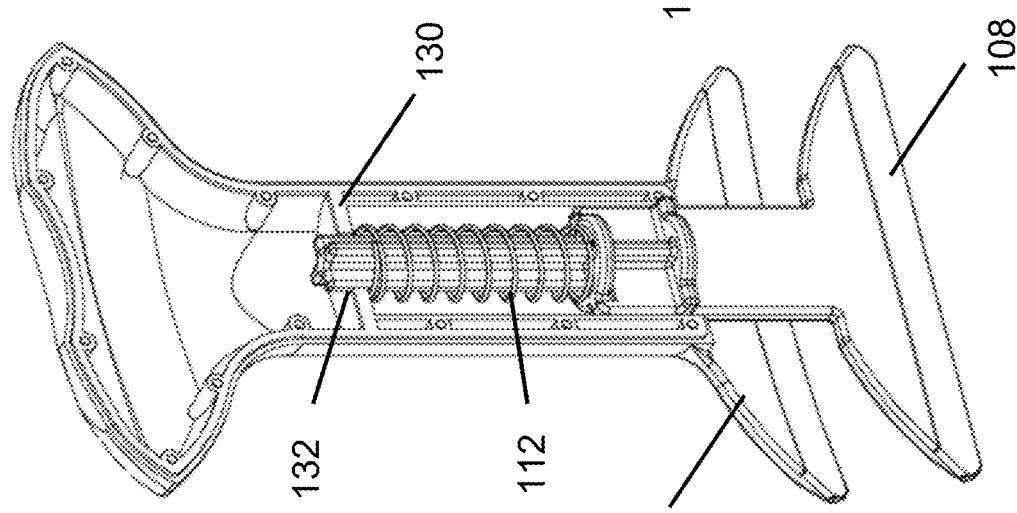
FIG. 7 is a perspective view of the back housing with the central cutting blade in the extended configuration.
Figure 6:
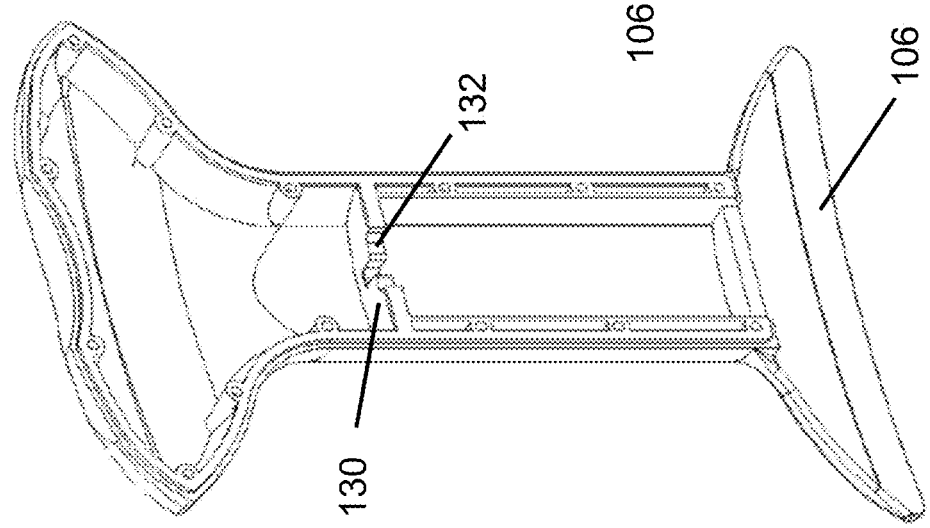
FIG. 6 is a perspective view of a back housing of the food chopper of FIG. 1.
Figure 10:
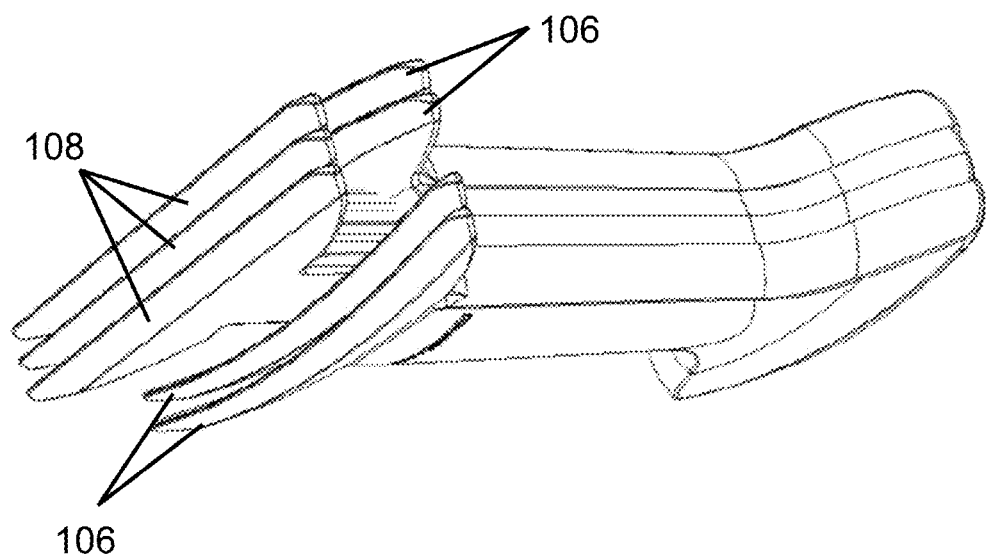
FIG. 10 is a lower perspective view of an alternative embodiment of the food chopper that includes a plurality of central cutting blades and a plurality of side cutting blades.

The food chopper 100 may be formed with a two-part enclosure. The two parts for the enclosure may have a similar shape such that only one mold is needed to fabricate the two-part enclosure. FIGS. 6-8 illustrate one such part. To minimize the number of molds needed to fabricate the food chopper 100 and enhance the structural rigidity of the food chopper 100, the handle 102, the shaft 104 and the side cutting blade 106 may be fabricated as a single piece.

The proximal end of the central cutting blade 108 may have an X shape, as illustrated in FIGS. 7 and 8. Using such a configuration provides a structure over which the spring 112 can extend. The X shape also provides a mechanism for controlling the movement of the central cutting blade 108 between the extended configuration and the retracted configuration.

In this regard, a reinforcing member 130 is provided at an intermediate location in the interior of the shaft 104. The reinforcing member 130 has a recess 132 formed therein with a shape that generally corresponds to about one-half of the proximal end of the central cutting blade 108 as illustrated in FIGS. 6-8.

The top or proximal end of the central cutting blade 108 includes a flange 114, or other travel limiting means, to prevent the member from extending distally too far out of the body 104, and potentially falling out or ejecting from the body. The flange 114 abuts a stop inside of the body to define the maximum distal travel.

In certain embodiments, the spring 112 has a generally helical configuration and is fabricated from a metallic material. Using the helical configuration allows the spring 112 to extend over the proximal end of the central cutting blade 108. A person of skill in the art will appreciate that a variety of mechanisms can be used that permit the central cutting blade 108 to move between the extended configuration and the retracted configuration while urging the central cutting blade 108 to the extended configuration.

In an additional aspect, an adjustment member, such as a threaded nut or a locking collar, can be provided adjacent to the spring 112 to shorten or lengthen the stroke of the central cutting blade 108.

The spring force may be adjustable to provide sufficient resistance to the downward movement such that the central cutting blade 108 penetrates the food so that the central cutting blade 108 performs a chopping function. Alternatively, the force can be set so that the central cutting blade 108 merely holds the food item in place while the side cutting blades 106 perform the chopping function.

The food chopper 100 may include a locking mechanism 128 that selectively engages the central cutting blade 108 to retain the central cutting blade 108 in at least one of the extended configuration and the retracted configuration. A person of skill in the art will appreciate that a variety of techniques may be used for the locking mechanism.

In certain embodiments, the food chopper 100 is permanently assembled so that the components cannot be separated from each other. An example of one suitable technique for permanently assembling the food chopper 100 is an adhesive. Another embodiment of the food chopper 100 permits the components of the food chopper 100 to be disassembled such as to facilitate cleaning of the components and/or replacement of damaged or degraded components. An example of one suitable technique fastener that permits removable assembly of the food chopper 100 is a screw 129. This configuration may be particularly desirable for use in commercial applications.

The components of the food chopper 100 may be fabricated from a variety of materials using the concepts of the invention. The materials used in fabricating the food chopper 100 should provide the food chopper 100 with sufficient strength so that the food chopper 100 withstands typical forces placed thereon during the use of the food chopper 100. The materials used in fabricating the food chopper 100 should also provide the ability to clean and/or sanitize the food chopper 100 between uses thereof. A person of skill in the art will appreciate that a variety of ceramic, metallic and/or polymeric materials may be used to fabricate the food chopper 100. An example of one suitable polymeric material is nylon. A combination of materials can be employed, such as a plastic body with stainless steel blades.

The components of the food chopper 100 may be fabricated from heat resistant materials that enable the food chopper 100 to be used for cutting food directly in a pan in which the food is to be cooked. Such use can be either for cutting the food or manipulating the food in the pan such as to promote even cooking of the food.

A variety of techniques may be used to fabricate the food chopper 100. An example of one suitable technique that may be used to fabricate the food chopper 100 is injection molding.

When cutting certain foods there may be a desirability to minimize the potential of the food chopper 100 being used with other types of foods that potentially present a health risk and/or are undesirable for religious considerations. For example, it may be undesirable to use a particular food chopper 100 with both fruits/vegetables and meats.

To enhance the ability of the person using the food chopper 100 to identify the intended/acceptable use of the food chopper 100, at least a portion of the food chopper 100 may be fabricated from a color that is associated with the intended use of the food chopper 100. For example, the food chopper 100 that is intended for use with fruits and vegetables may be fabricated with a green color and the food chopper 100 that is intended for use with meat may be fabricated with a red color.

As an alternative to fabricating the entire food chopper 100 with a different color, it is possible to fabricate a portion of the food chopper 100 from a use-identifying color. For example, the central cutting blade 108 may be fabricated from a use-identifying color. Alternatively or additionally, the food chopper 100 may include a label that identifies the intended use of the food chopper 100.

The food chopper 100 may be fabricated with different sizes that so that the food chopper 100 is particularly suited for cutting food having different sizes. For example, the food chopper 100 having a smaller size may be used for cutting herbs and the food chopper 100 having a larger size may be used for cutting larger size food such as melons.

The food chopper 100 may be formed with more than one central cutting blade 108 and/or more than one side cutting blade 106 on each side thereof as illustrated in FIG. 5. These additional cutting blades may be particularly desirable where it is desirable to cut larger quantities of food and/or where it is desired to cut the food into more fine pieces.

The distal end 110 of the food chopper 100 may be formed with a shape that generally conforms to the shape of the surface 158 on which the food chopper 100 is intended to be used. Using such a configuration not only enhances the cutting action of the food chopper 100 but also enhances the stability of the food chopper 100 as the downward force is applied thereto.

For example, when it is intended to use the food chopper 100 on a flat surface, the distal end 110 of the food chopper 100 may be substantially straight. Alternatively, when the food chopper 100 is intended to be used in a bowl having a curved bottom, the at least a portion of the distal end 110 of the food chopper 100 should be formed with a curvature that is similar to the curvature of an inner surface of the bowl 158 as illustrated in FIG. 16. The curved distal end 110 is convex as illustrated in FIG. 16.

Figure 17:
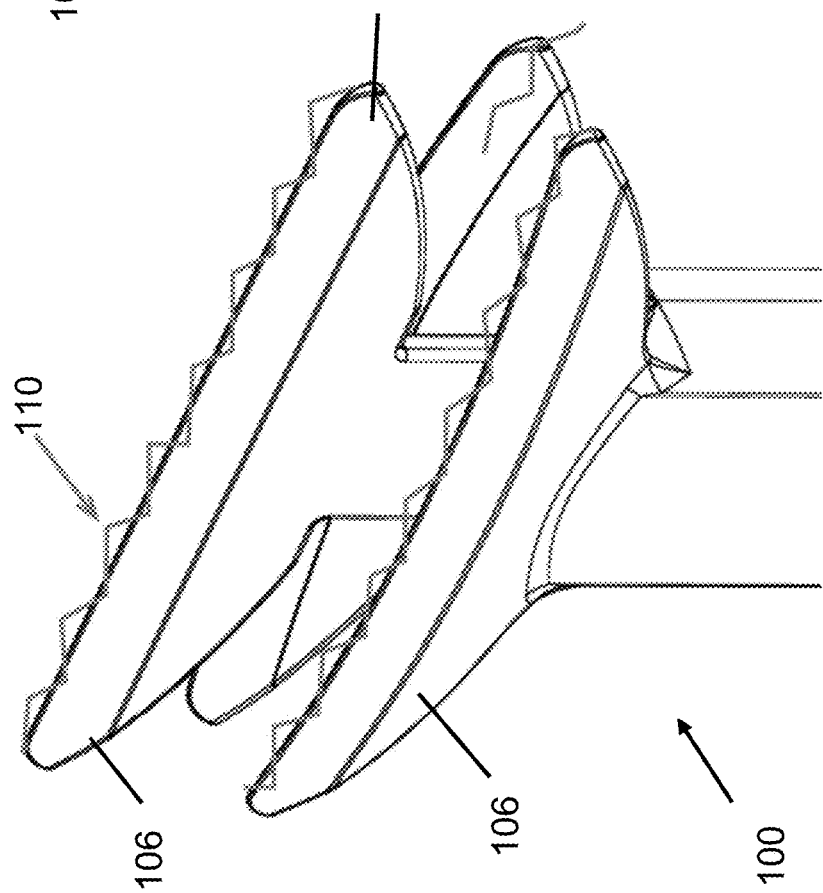
FIG. 17 is a lower perspective view of another embodiment of the food chopper with zig-zag shaped cutting blades.

In other embodiments, the distal ends of the cutting blades may be formed with a zig-zag pattern as illustrated in FIG. 17. The zig-zag pattern may facilitate cutting the food in different shapes and such different shapes may enhance the attractiveness of the food to persons that are desired to consume the food.

Figure 18:
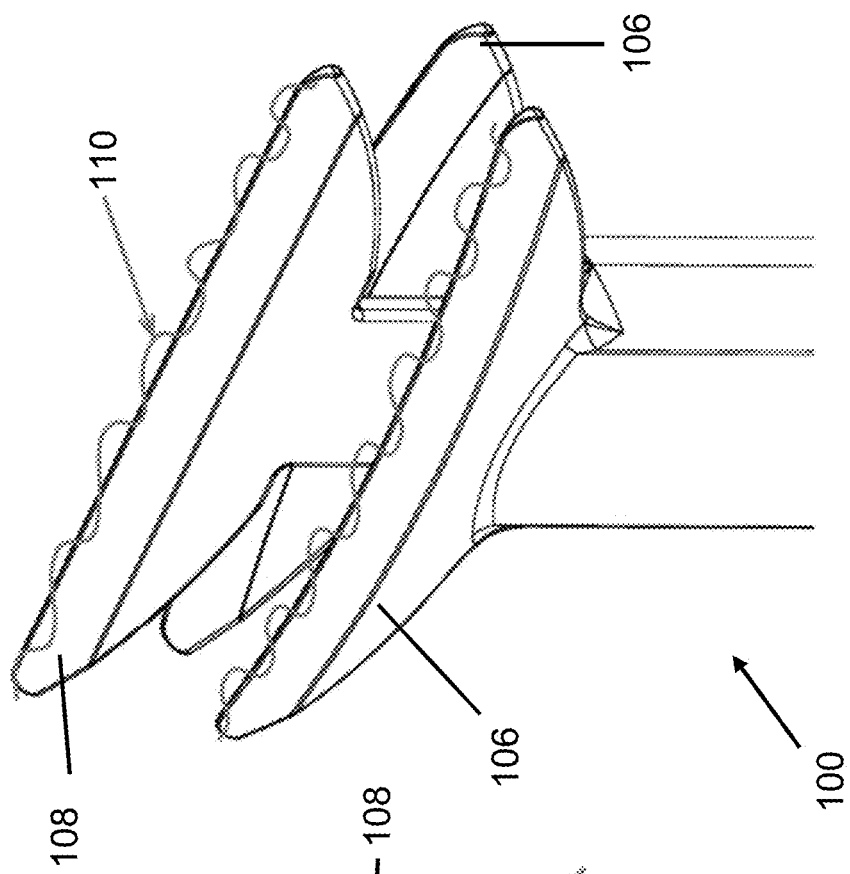
FIG. 18 is a lower perspective view of another embodiment of the food chopper with oscillating cutting blades.

In still other embodiments, the distal ends 110 of the cutting blades 106, 108 may be formed with an oscillating curved shape as illustrated in FIG. 18. The oscillating curved shape may facilitate cutting the food in different shapes and such different shapes may enhance the attractiveness of the food to person that are desired to consume the food.

Figure 19:
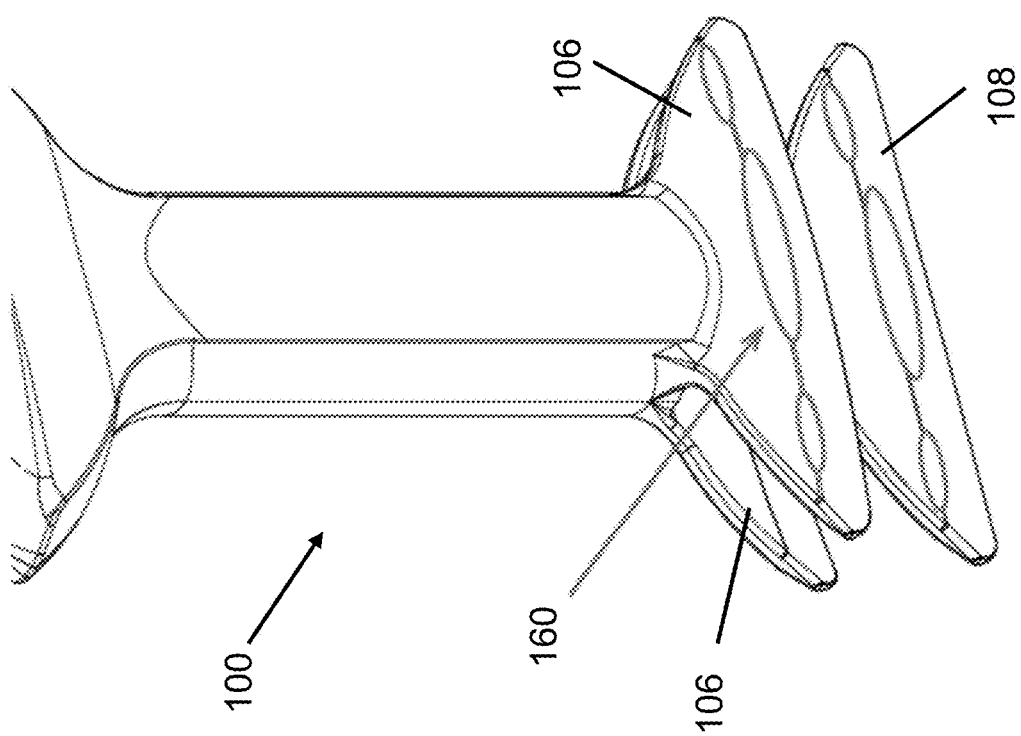
FIG. 19 is a side view of another embodiment of the food chopper that has round apertures in the central cutting blade and the side cutting blade.
Figure 20:
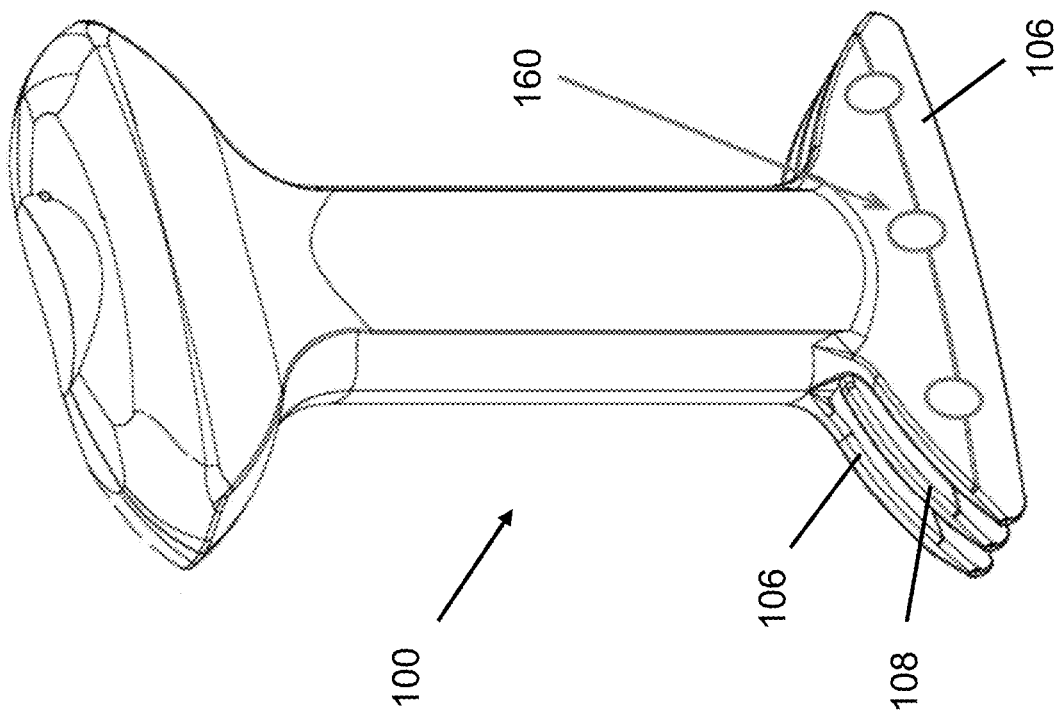
FIG. 20 is a side view of another embodiment of the food chopper that has oval apertures in the central cutting blade and the side cutting blade.

Apertures 160 may be formed in the cutting blades 106, 108 proximate the distal end thereof. In certain embodiments, the apertures 160 may have a circular shape as illustrated in FIG. 19. In other embodiments, the apertures 160 may have a generally oval shape as illustrated in FIG. 20. The apertures 160 are positioned in a spaced-apart configuration. The apertures 160 allow food being cut with the food chopper to pass therethrough. The apertures 160 thereby enhance mixing of the food that is being cut with the food chopper.

Figure 22:
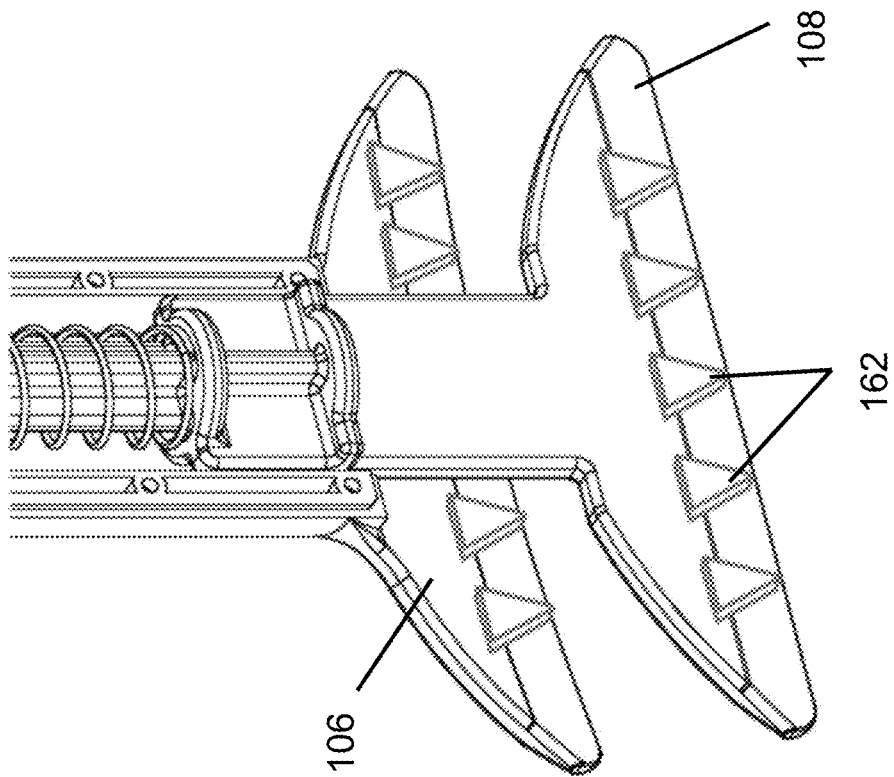
FIG. 22 is a side view of another embodiment of the food chopper that has triangular ridges on the central cutting blade and the side cutting blade.
Figure 21:
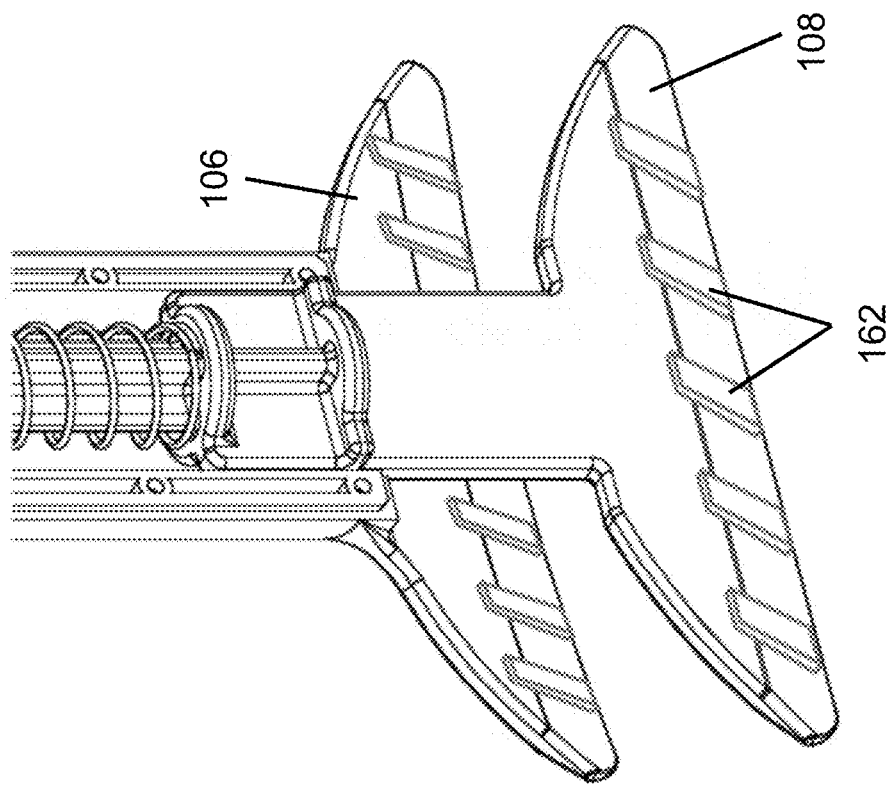
FIG. 21 is a side view of another embodiment of the food chopper that has rectangular ridges on the central cutting blade and the side cutting blade.

Ridges 162 may be provided on at least one surface of the cutting blades 106, 108 proximate the distal end thereof. In other embodiments, the ridges 162 may have a generally rectangular shape as illustrated in FIG. 21. In certain embodiments, the ridges 162 may have a generally triangular shape as illustrated in FIG. 22. The ridges 162 are positioned in a spaced-apart configuration. The ridges 162 enhance the mixing of the food that is being cut with the food chopper.

Figure 23:
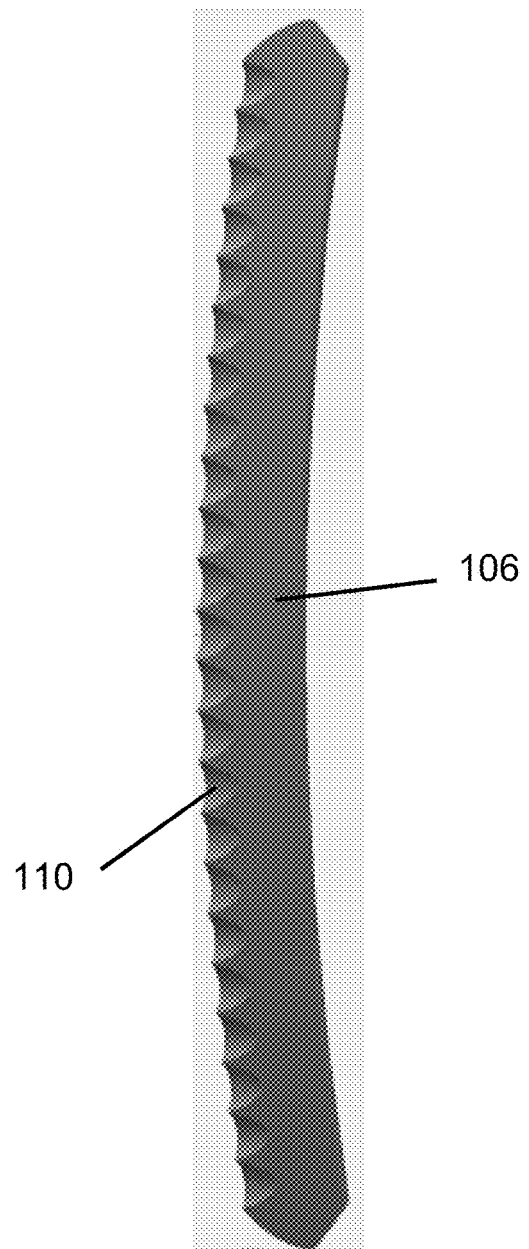
FIG. 23 is a side view of a cutting blade having a serrated edge for use in the food chopper.

As an alternate to the distal end 110 of the first side cutting blade 106, the second side cutting blade 106 and the central cutting blade 108 being substantially straight, the distal end 110 of at least one of the first side cutting blade 106, the second side cutting blade 106 and the central cutting blade 108 may have a serrated edge as illustrated in FIG. 23.

In addition to using the cutting blades to cut food, the cutting blades may be used in conjunction with further processing of the food. For example, at least one of the cutting blades 106, 108 may be used to mix the food after the food is cut or for blending dry ingredients such as grains, oats, dried fruits, flour, sugar, etc.

The food chopper 100 may be positioned so that the central cutting blade 108 is nearly parallel to a surface on which the object is being cut. The food chopper 100 is then moved with respect to the surface on which the object to cause the object to move onto the central cutting blade 108. Using such a process, the food chopper 100 can be used for scooping the objects such as transferring the objects from the surface on which the object is cut to a pan where the object is cooked.

In use, the user extends his/her hand around the handle portion 102 with one or more hands and aligns the food chopper 100 over the object 172 to be chopped. The user moves the food chopper 100 vertically downwards to contact the central cutting blade 108 against the object 172 or the surface 170 adjacent to the object 172. The user continues to move the food chopper 100 vertically downward towards the surface 170 until the side cutting blades 106 contact the surface 170 to cut the object 172.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method of chopping food comprising:
providing a food chopper comprising a handle, a first side cutting blade, a second side cutting blade, a central cutting blade and a biasing mechanism, wherein the first side cutting blade is mounted in a stationary position with respect to the handle, wherein the first side cutting blade has a distal edge with a first end and a second end that is opposite the first end, wherein the second side cutting blade is mounted in a stationary position with respect to the handle in a spaced-apart relationship with respect to the first side cutting blade, wherein the second side cutting blade has a distal edge with a first end and a second end that is opposite the first end, wherein the central cutting blade is operably attached to the handle intermediate the first side cutting blade and the second side cutting blade, wherein a distal edge of the central cutting blade has a first end and a second end that is opposite the first end, wherein the first side cutting blade is curved so that a distance between the first end of the first side cutting blade and first end of the central cutting blade is smaller than a distance between the first side cutting blade and the central cutting blade intermediate the first and second ends thereof and that a distance between the second end of the first side cutting blade and second end of the central cutting blade is smaller than a distance between the first side cutting blade and the central cutting blade intermediate the first and second ends thereof, wherein the central cutting blade is linearly slidably movable between a retracted configuration and an extended configuration and wherein the biasing mechanism biases the central cutting blade to the extended configuration;
placing an object that is to be cut on a surface;
placing the central cutting blade in contact with the at least one of the object and the surface; and
urging the handle towards the surface to cause the first side cutting blade and the second side cutting blade to contact the surface and cut the object into pieces.

2. The method of claim 1, wherein the distal edge of the second side cutting blade is curved so that:
a distance between the first end of the second side cutting blade and the first end of the central cutting blade is smaller than a distance between the second side cutting blade and the central cutting blade intermediate the first and second ends thereof; and
a distance between the second end of the second side cutting blade and the second end of the central cutting blade is smaller than a distance between the second side cutting blade and the central cutting blade intermediate the first and second ends thereof.

3. The method of claim 1, wherein the first side cutting blade and the second side cutting blade each have a distal edge that is opposite the handle, wherein at least one of the first side cutting blade and the second side cutting blade is curved in a direction that extends from the distal edge to the handle.

4. The method of claim 1, wherein distal edge of at least one of the first side cutting blade and the second side cutting blade is convex and wherein at least a portion of the distal edge substantially conforms to the surface.

5. The method claim 1, wherein the food chopper further comprises a shaft that substantially encloses the biasing mechanism, wherein the shaft extends from the handle.

6. A food chopper comprising:
   a handle;
   a first side cutting blade mounted in a stationary position with respect to the handle, wherein a distal edge of the first side cutting blade has a first end and a second end that is opposite the first end;
   a second side cutting blade mounted in a stationary position with respect to the handle in a spaced-apart relationship with respect to the first side cutting blade, wherein a distal edge of the second side cutting blade has a first end and a second end that is opposite the first end;
   a central cutting blade operably attached to the handle intermediate the first side cutting blade and the second side cutting blade for linearly slidable movement between an extended configuration and a retracted configuration, wherein a distal edge of the central cutting blade has a first end and a second end that is opposite the first end, and wherein the distal edge of the first side cutting blade is curved so that:
      a distance between the first end of the first side cutting blade and the first end of the central cutting blade is smaller than a distance between the first side cutting blade and the central cutting blade intermediate the first and second ends thereof; and
      a distance between the second end of the first side cutting blade and the second end of the central cutting blade is smaller than a distance between the first side cutting blade and the central cutting blade intermediate the first and second ends thereof; and
   a biasing mechanism that biases the central cutting blade to the extended configuration.

7. The food chopper of claim 1, wherein when the central cutting blade is in the retracted configuration, the distal edge of the central cutting blade is substantially aligned with the distal edges of the first side cutting blade and the second side cutting blade and wherein when the central cutting blade is in the extended configuration, the distal edge of the central cutting blade is further away from the handle than the distal edges of the first side cutting blade and the second side cutting blade.

8. The food chopper of claim 1, wherein the distal edge of the second side cutting blade is curved so that:
   a distance between the first end of the second side cutting blade and the first end of the central cutting blade is smaller than a distance between the second side cutting blade and the central cutting blade intermediate the first end and the second end; and
   a distance between the second end of the second side cutting blade and the second end of the central cutting blade is smaller than a distance between the second side cutting blade and the central cutting blade intermediate the first and second ends thereof.

9. The food chopper of claim 1, wherein at least one of the first side cutting blade and the second side cutting blade is curved in a direction that extends from the distal edge to the handle.

10. The food chopper of claim 1, wherein the curved distal edge of at least one of the first side cutting blade and the second side cutting blade is convex.

11. The food chopper of claim 1, wherein the first side cutting blade and the second side cutting blade each have at least one aperture formed therein.

12. The food chopper of claim 1, wherein proximate the distal edges thereof, the first side cutting blade and the second side cutting blade each have a plurality of ridges extending from at least one surface thereof.

13. The food chopper of claim 1, wherein proximate the distal edges thereof, at least one of the first side cutting blade, the second side cutting blade and the central cutting blade has an oscillating shape or a zig-zag shape.

14. The food chopper of claim 1, wherein proximate the distal edges thereof, at least a portion of the first side cutting blade and the second side cutting blade is serrated.

15. The food chopper of claim 1, wherein the central cutting blade comprises a plurality of cutting blades mounted in a spaced-apart relationship, wherein the first side cutting blade comprises a plurality of cutting blades mounted in a spaced-apart relationship and wherein the second side cutting blade comprises a plurality of cutting blades mounted in a spaced-apart relationship.

16. The food chopper of claim 1, and further comprising a shaft that substantially encloses the biasing mechanism, wherein the shaft is intermediate the handle and the first and second side cutting blades.

17. A food chopper comprising:
   a shaft having a proximal end and a distal end;
   a handle attached to the proximal end of the shaft;
   a first side cutting blade mounted in a stationary position with respect to the distal end of the shaft, wherein a distal edge of the first side cutting blade has a first end and a second end that is opposite the first end;
   a second side cutting blade mounted in a stationary position with respect to the distal end of the shaft in a spaced-apart relationship with respect to the first side cutting blade, wherein a distal edge of the second side cutting blade has a first end and a second end that is opposite the first end;
   a central cutting blade linearly slidably mounted to the distal end of the shaft for movement between a retracted configuration and an extended configuration, wherein a distal edge of the central cutting blade has a first end and a second end that is opposite the first end, wherein the distal edge of the first side cutting blade is curved so that:
      a distance between the first end of the first side cutting blade and the first end of the central cutting blade is smaller than a distance between the first side cutting blade and the central cutting blade intermediate the first and second ends thereof; and
      a distance between the second end of the first side cutting blade and the second end of the central cutting blade is smaller than a distance between the first side cutting blade and the central cutting blade intermediate the first and second ends thereof; and
   a biasing mechanism, wherein the shaft substantially encloses the biasing mechanism and wherein the biasing mechanism biases the central cutting blade to the extended configuration.

18. The food chopper of claim 17, wherein the shaft has at least one aperture formed therein.

19. The food chopper of claim 18, and further comprising a cover that substantially covers the at least one aperture.

20. The food chopper of claim 17, wherein the distal edge of the second side cutting blade is curved so that:
- a distance between the first end of the second side cutting blade and the first end of the central cutting blade is smaller than a distance between the second side cutting blade and the central cutting blade intermediate the first and second ends thereof; and
- a distance between the second end of the second side cutting blade and the second end of the central cutting blade is smaller than a distance between the second side cutting blade and the central cutting blade intermediate the first and second ends thereof.

* * * * *